United States Patent
Zhao (10) Patent No.: US 7,545,823 B1
(45) Date of Patent: *Jun. 9, 2009

(54) VOIP OVER ACCESS NETWORK

(75) Inventor: Jiabin Zhao, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 11/377,955

(22) Filed: Mar. 16, 2006

Related U.S. Application Data (63) Continuation of application No. 09/919,982, filed on Jul. 31, 2001, now Pat. No. 7,046,683.

(51) Int. Cl.
*H04L 12/56* (2006.01)
(52) U.S. Cl. .............. 370/401; 370/352; 370/395.1
(58) Field of Classification Search ............ 370/352, 370/395.1, 401, 524, 353, 354, 355, 356, 370/395.2, 395.21, 395.5, 395.51, 395.52, 370/395.6, 465, 466
See application file for complete search history.

(56) References Cited

U.S. PATENT DOCUMENTS

| | | | |
|---|---|---|---|
| 6,563,816 B1 * | 5/2003 | Nodoushani et al. ........ 370/352 |
| 6,614,781 B1 * | 9/2003 | Elliott et al. ................ 370/352 |
| 6,697,475 B1 * | 2/2004 | MeLampy et al. ..... 379/201.12 |
| 6,785,264 B1 * | 8/2004 | Borden et al. ............... 370/352 |
| 6,879,667 B1 | 4/2005 | Carew et al. |
| 2002/0064152 A1 * | 5/2002 | Lemley et al. .............. 370/352 |
| 2002/0176403 A1 | 11/2002 | Radian |
| 2003/0007495 A1 | 1/2003 | Thune et al. |
| 2003/0091032 A1 | 5/2003 | Laxman et al. |
| 2003/0167348 A1 * | 9/2003 | Greenblat ................... 709/251 |

OTHER PUBLICATIONS

Network Working Group, *Media Gateway Control Protocol (MGCP), Ver. 1.0*, May 4, 2001, pp. 1-126.

* cited by examiner

*Primary Examiner*—Wing F Chan
*Assistant Examiner*—Mark A Mais
(74) *Attorney, Agent, or Firm*—Stolowitz Ford Cowger LLP (57) ABSTRACT

A system and method are disclosed for controlling access networks directly via a packet network gateway that is itself controlled by a remote call agent. In one embodiment, the gateway performs translation between access network protocol signaling and gateway control protocol messaging such that, to the call agent, the gateway appears to be physically connected to a group of subscribers directly, and to the access network, the gateway appears to function as a circuit-switched network. In one application, a gateway according to the present invention thus allows existing access network devices to connect directly to a packet network without having to pass through an intervening PSTN circuit switch.

15 Claims, 9 Drawing Sheets

VOIP OVER ACCESS NETWORK

CROSS REFERENCE TO RELATED APPLICATIONS

This application is a continuation of U.S. patent application Ser. No. 09/919,982, filed on Jul. 31, 2001 now U.S. Pat. No. 7,046,683, which is herein incorporated by reference in its entirety. Priority to U.S. patent application Ser. No. 09/919,982 filed Jul. 31, 2001 is claimed under 35 U.S.C. 120.

FIELD OF THE INVENTION

This present invention relates generally to telephony, and more particularly to systems and methods for packet-based telephony.

BACKGROUND OF THE INVENTION

The traditional telephone network, or "PSTN" (Public Switched Telephone Network) operates as a circuit-switched network. That is, when caller A places a PSTN call to B, a particular PSTN "circuit" is dedicated to transmitting voice data between A and B. The circuit may be a physical circuit, i.e., a given trunk channel may be designated between each of several switching points for transmitting voice data between endpoints A and B. The circuit may also be a "virtual" circuit, e.g., the circuit may be allotted a particular amount of bandwidth on an ATM (Asynchronous Transfer Mode) trunk, with the voice data broken up into cells that are carried across the ATM trunk individually, with cells from other calls (or representing other types of data) interspersed on the trunk. A given call may use physical circuits for some parts of its path and virtual circuits for others, and calls may also be dynamically re-routed to different circuits during the duration of a call.

The access network is, historically, the part of the PSTN that physically connects to or terminates the subscriber lines. It includes the lines running to the customer premises and the devices attached to the PSTN end of those lines. The access network performs such functions as transmitting subscriber speech data, transmitting and receiving line signals such as off-hook, on-hook, duration, voltage, frequency of meter pulse, ringing current, and dial pulse receiving. An access network device typically serves multiple subscribers, and may communicate with the subscribers using analog signaling, Integrated Services Digital Network (ISDN) channels, or other signaling formats.

An access network device does not perform call switching or call processing, and therefore needs no knowledge of a dial plan or the structure of the network. Instead, the access network device merely aggregates voice data and signaling to or from its subscribers on a direct trunk to a defined switching point, such as a PSTN central office. The access network device communicates with the switching point using an access network protocol, such as V5 (see V-Interface at the Digital Local Exchange (LE)—V5.2 Interface (Based on 2048 kbit/s) for the Support of Access Network (AN), ITU-T, G.965, March 1995) or GR.303 (see GR-303-CORE Issue 4, "IDLC (Integrated Digital Loop Carrier) Generic Requirements, Objectives, and Interface", December 2000, and the associated Issues List Report: GR-303-ILR Issue 4A, December 2000, Telcordia). These protocols use relatively simple command sets to request channels between the access network device and the switching point, allocate and deallocate such channels, notify the switching point of dialed digits, hookflash, off-hook, and on-hook conditions at the subscriber endpoint, notify the access network device of caller ID information, etc.

A relative newcomer to telephony is packet voice transmission, sometimes referred to as Voice-Over-IP (VoIP) based on the dominance of Internet Protocol (IP) as a network protocol for packet-switched communication. A primary difference between circuit-switching and packet-switching is that, instead of allocating circuits for data streams, packet-switching breaks a data stream (such as a voice data stream, computer data stream, etc.) into individually-routable chunks of data ("packets"). Each packet contains a header with information that describes the packet's source and destination, but not its route. The switching points in a packet-switched network (commonly called "routers" at the network level) examine each received packet's header individually in order to make next-hop routing decisions, thus no dedicated "circuits" or circuit switches are required.

Completely VoIP calls can be set up between two packet-networked computers or devices, as long as the calling endpoint has a way to determine the other's IP address. On the other hand, the PSTN and its usage are ubiquitous, and therefore a much more useful model for VoIP performs packet-switched call routing between two PSTN switching points. This allows telephone subscribers to use familiar dialing and phone operation procedures, while at the same time allowing a network operator to take advantage of packet-based efficiencies and flexibility.

Figure 1:
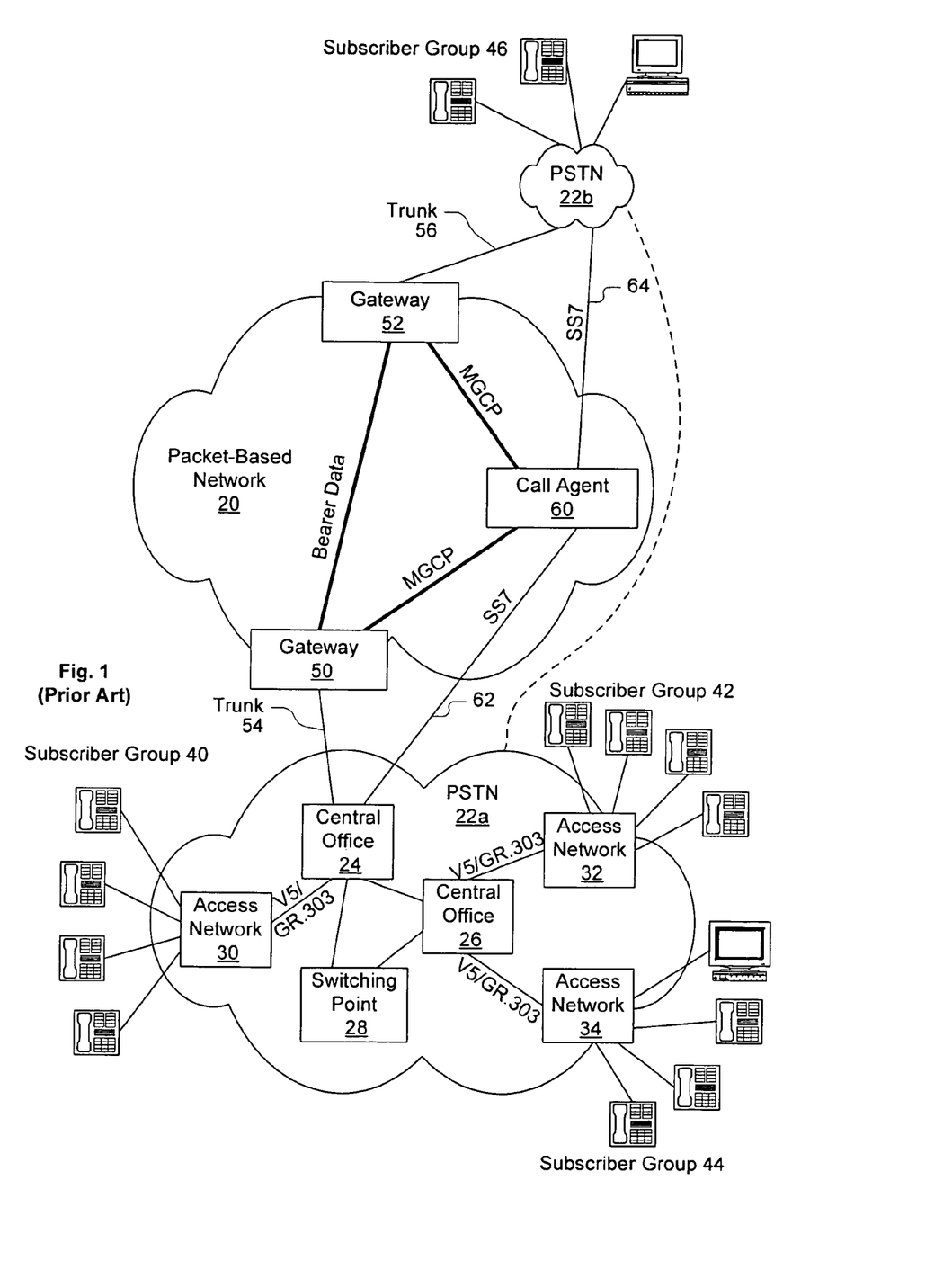
FIG. 1 illustrates a prior art network configuration for VoIP.

Routing of PSTN calls over a packet-based network is typically accomplished using gateways and call agents, as shown in FIG. 1. A packet-based network 20 and two sections of PSTN 22a, 22b are illustrated. Within PSTN section 22a, two central offices 24 and 26 are connected by a trunk, and are also each trunked to a third switching point 28. Other trunks and switching points (not shown) connect 24, 26, and/or 28 to the remainder of the PSTN, including PSTN section 22b. Access network devices 30, 32, 34 connect to the central offices, and respectively support subscriber groups 40, 42, 44. Similar infrastructure (not shown) exists in PSTN section 22b to support subscriber group 46.

Circuit-switched calls can enter and leave packet-based network 20 through gateways (sometimes also called network access servers) such as gateways 50 and 52. A typical gateway connects at least one ingress port to a PSTN trunk, e.g., a trunk that time-division-multiplexes many digitally sampled voice channels using well-known physical data formats, such as E1, T1, and T3. The gateway also connects at least one egress port to a packet-based network.

The typical gateway can process both voice and data calls received at its ingress ports. For a data call, the gateway establishes a network access session and allocates a modem resource to that session. The modem resource translates packets to and from the physical format (e.g., pulse-code modulation) used on the trunk for the data call. For a voice call, the gateway allocates a codec (compressor/decompressor) resource to that call. The codec resource compresses time slices of voice data into packets and buffers them for transmission out the egress port. The codec resource decompresses similar packets received from the other end of the call and buffers them for playout onto the appropriate channel of a PSTN trunk.

In FIG. 1, gateways 50 and 52 reside at the edge of packet-based network 20. For instance, a long-distance carrier who wishes to transport calls between two local exchanges may own gateways 50 and 52. Gateway 50 connects to central office 24 via trunk 54. Likewise, gateway 52 connects to a switching point (not shown) in PSTN section 22b via trunk 56.

Within packet-based network 20, a call agent 60 performs the call processing functions of a circuit switch, but in a different way. Call agent 60 exchanges circuit-switched signaling with the switching points controlling trunks 54, 56, using signal paths 62, 64. Call agent 60 thus performs call processing for calls on trunks 54, 56, although it does not usually physically terminate those trunks. Call agent 60 also controls gateways 50, 52, using a gateway control protocol, such as Media Gateway Control Protocol (MGCP), as described in Network Working Group RFC 2705.

Call agents can perform many functions, including call authorization and billing, terminating gateway location, communication with circuit switches or other call agents, traffic management, etc. Generally, the call agent manages the trunks of each gateway, instructing the gateway when and how to allocate a channel, and instructing the gateway as to the destination gateway for the voice data. After receiving permission from the call agent, the originating and terminating gateways generally negotiate the format in which voice (or bearer) data will pass between them, i.e., data rate, codec, whether the call will be encrypted, etc. The gateways then pass bearer data between themselves for the duration of the call, without the intervention of the call agent. Finally, when one endpoint terminates the call, the call agent is notified; the call agent signals the PSTN switches to take down the call, and instructs the gateways to perform clean up on the resources used for the call.

SUMMARY OF THE INVENTION

The legacy telephone service providers dominate local telephone service, primarily because those service providers own the access networks that connect to their central offices. The central offices and local exchanges of these providers perform switching and call processing for local calls, even calls between two subscribers located on the same access network. Competitive local exchange carriers thus find it difficult to enter this market by connecting to the central offices, as the central offices already efficiently perform local switching.

This disclosure describes an alternative for competitive local exchange carriers, using a gateway that is capable of direct connection to an access network device. Accordingly, one aspect of the present invention is a packet voice gateway equipped with at least one voice data port capable of connection to and communication with an access network device, and at least one packet data port capable of connection to and communication with a packet-based network. The gateway further comprises an access network interface capable of exchanging signaling, using an access network protocol, with an access network device connected to the voice data port. The access network interface is also capable of exchanging signaling packets, using a packet-based gateway control protocol, with a call agent reachable over a packet-based network using the packet data port. And the access network interface is capable of translating signaling between the access network protocol and the gateway control protocol. As a result, the gateway emulates a circuit-switched network to the access network device, and controls the access network device directly based on gateway control commands issued by the call agent.

In another aspect of the present invention, a method for processing voice calls in a packet voice gateway is disclosed. The method includes tracking call status for a call connected through the access network device, receiving access network signaling messages from an access network device, and translating those messages as appropriate into packet-based gateway control protocol messages, based on call status and received access network signaling. The gateway control messages are related to a call agent. In one preferred embodiment, this method is implemented in software running on one or more processors located in the gateway.

In yet another aspect of the present invention, a method for operating a packet voice gateway having multiple voice data ports is disclosed. Generally, this method allows configuration of one or more of the voice data ports for connection to an access network device, and configuration of other voice data ports for connection to a circuit-switched trunk device, e.g., from a central office or local exchange. The gateway then exchanges signaling with connected access network devices using an access network protocol, and can also exchange signaling with connected circuit-switched trunk devices using a trunking protocol (the trunk signaling can be backhauled to the call agent for processing). The gateway places call completion for voice calls from both port configurations under control of a call agent that controls the gateway via a gateway control protocol. The gateway coordinates signaling on both access network and circuit-switched trunks with call completion transactions passing between the call agent and the gateway.

BRIEF DESCRIPTION OF THE DRAWING

The invention may be best understood by reading the disclosure with reference to the drawing, wherein.

DETAILED DESCRIPTION

Several terms used in the following description require definition. A "packet voice gateway" provides an interface between a packet-based network and some other type of network or device(s), including analog voice/data lines, channelized lines such as ISDN primary rate interface (PRI) and basic rate interface (BRI) lines, time-division-multiplexed trunks such as T1, E1, T3 trunks, ATM trunks, etc. Although such a gateway at least provides the capability to translate voice calls between a packet format and the format of the other network or device, many gateways perform other functions as well, such as terminating data calls with a modem, and packet routing for packet data arriving at the gateway in that format. Within such a gateway, a "voice data port" provides a physical connection point for communication with the other type of network or device, and a "packet data port" provides a physical connection point for data communication with a packet-based network, such as an IP network.

Figure 2:
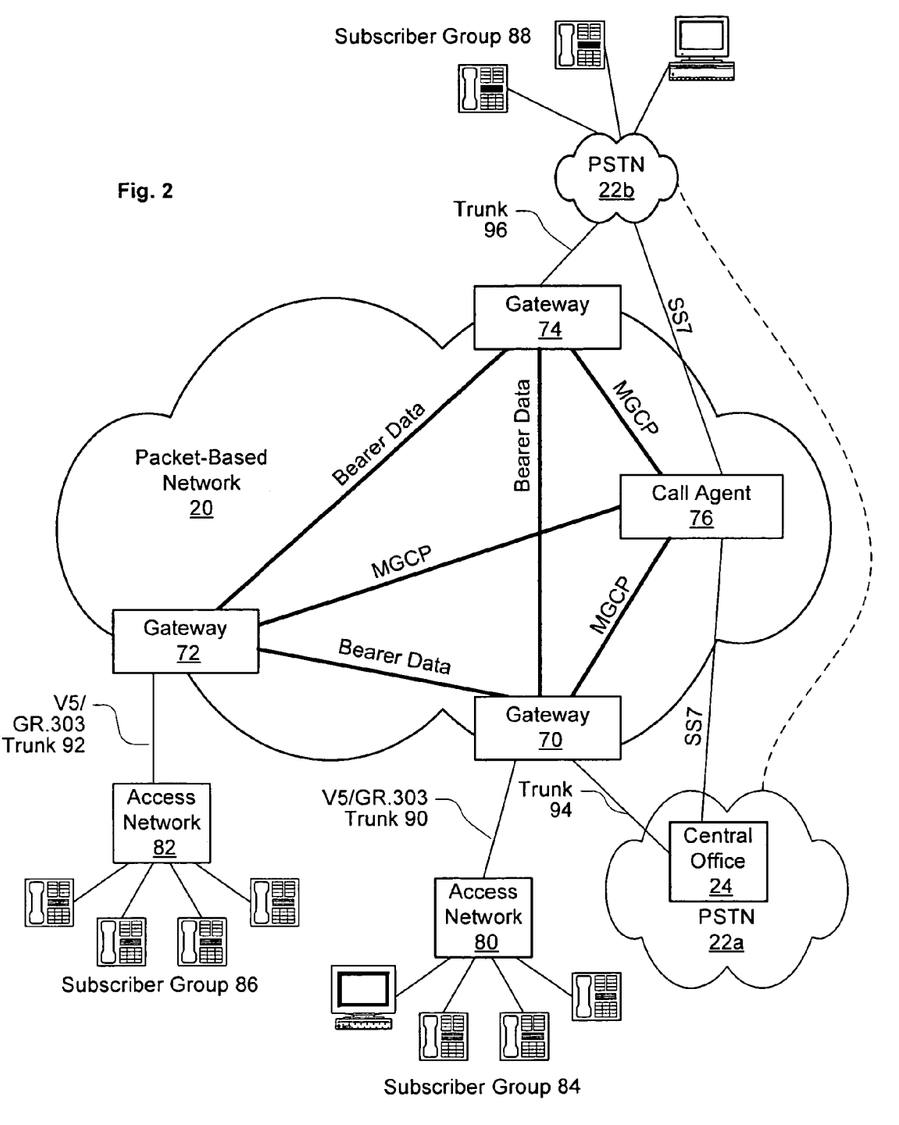
FIG. 2 illustrates a network configuration for VoIP according to an embodiment of the present invention.

As an introduction to the embodiments, FIG. 2 illustrates one basic network scenario for operation according to an embodiment of the invention. Gateway 70 connects to access network device 80 via access network trunk 90. Access network device 80 serves subscribers 84. Similarly, gateway 72 connects to access network device 82 via access network trunk 92, in order to serve subscribers 86. Gateway 70 also connects to central office 24 in PSTN section 22a via a circuit-switched trunk 94. Gateway 74 connects via a circuit-switched trunk to PSTN section 22b, which serves subscribers 88. Gateways 70, 72, and 74 are controlled by call agent 76, e.g., using MGCP.

Call agent 76 also communicates with central office 24 and PSTN section 22b via SS7 signaling connections. Note that the SS7 signaling may alternately be "backhauled" through gateways 72 and 74 using packet communications between the gateways and the call agent, if those gateways are configured to packetize SS7 signaling bound for the call agent and depacketize SS7 signaling bound for the circuit-switched network.

Several differences from FIG. 1 are particularly significant. First, although access networks 80 and 82 can be typical PSTN access networks, they are physically decoupled from the PSTN. Second, call agent 7—instead of a PSTN switching point—controls calls to and from subscribers in groups 84 and 86, and need not notify any PSTN switching point of a call that does not originate or terminate outside of the controlled access networks. These differences allow a packet-based data network service provider to offer access network services to subscribers without a circuit-switched exchange carrier as a middleman.

In preferred implementations, the majority of—or all of—the changes to prior art devices that are necessary to implement an embodiment of the invention reside in the gateway. Therefore, a brief introduction to several gateway architectures precedes the discussion on how the operation of those gateways is modified to implement an embodiment of the invention.

Figure 3:
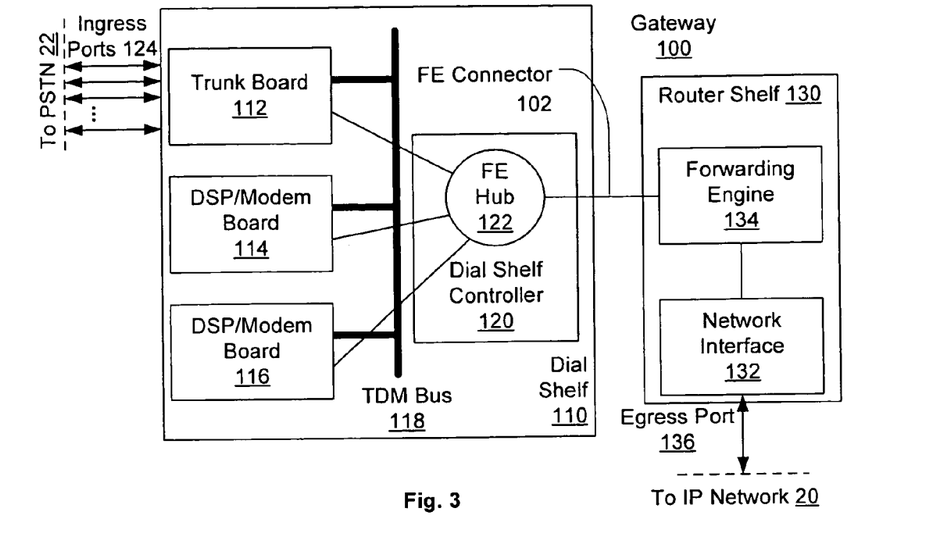
FIG. 3 contains a block diagram for a gateway configuration that can utilize the present invention.

FIG. 3 shows a block diagram for gateway 100. Gateway 100 comprises two separate rack-mountable chassis, a "dial shelf" 110 and a "router shelf" 130. Dial shelf 110 performs PSTN line interface tasks (including modem emulation, PPP session termination, VoIP PCM-to-packet translation, etc.), and router shelf 130 performs packet routing tasks. Dial shelf 110 and router shelf 130 exchange data in packets via a Fast Ethernet (FE) connector 102.

Dial shelf 110 is a modular chassis unit having a backplane that accepts several different types of circuit boards, or "feature boards". A dial shelf controller board 120 manages the dial shelf. Trunk board 112 provides multiple ingress ports 124 that can be used to terminate trunks from PSTN 22. DSP/modem boards 114 and 116 are identical, and provide pooled signal processing resources for use in modem emulation, VoIP packet translation, etc. Dial shelf 110 may incorporate redundant dial shelf controller boards, and/or additional trunk and DSP/modem boards (not shown).

Dial shelf 110's backplane includes a TDM bus 118 and a FE bus. TDM bus 18 multiplexes time-slotted data to/from ingress ports 124 onto bus time slots, allowing this data to be passed between trunk board 112 and DSP/modem boards 114 and 116. Router shelf 130 assigns specific DSP resources to each active session, and instructs trunk board 112 and the assigned DSP/modem board which time slot(s) on TDM bus 118 are to be used for that session.

Dial shelf controller 110 also contains a FE hub 122, which connects via the backplane FE bus to each of the trunk and DSP/modem boards. When a DSP/modem board builds out a VoIP or L2TP tunnel packet, it does so with a layer 2 (L2) Ethernet header addressed to router shelf 130. When a DSP/modem board receives a PPP frame, it encapsulates the frame with a layer 2 (L2) Ethernet header addressed to router shelf 130. In either case, the resulting frame is transmitted from the DSP/modem board to forwarding engine 134 via FE hub 122 and FE connector 102.

Forwarding engine 134 performs traditional routing tasks for the received frame. Forwarding engine 134 strips the L2 Ethernet header, processes the packet's headers, and looks up the next hop for the IP packet. A new L2 header is prepended to the packet, and the resulting frame is queued to network interface 132 (e.g., another FE interface) for transmission onto IP network 20.

When a packet is received at network interface 132 from IP network 20, a process complementary to the one described above is performed. In short, all packets received on egress port 136 are passed to forwarding engine 134, which modifies each packet's IP header, looks up the appropriate "next hop" DSP/modem board, and places the packet in a FE frame addressed to that DSP/modem board. The frame is then transmitted via FE connector 102 and FE hub 122 to the appropriate DSP/modem board on dial shelf 110.

Packets arriving at egress port 136 will generally have as their destination IP address the address of gateway 100.

Because of the modular nature of the dial shelf, additional ingress ports can be readily accommodated. TDM bus 118 is designed to handle a traffic volume at least equal to the maximum number of ingress ports supported by the gateway. As more trunk boards are added, more companion DSP/modem boards can also be added to handle the additional port traffic.

As ingress port traffic scales upwards, several egress-related bottlenecks might become traffic-limiting factors in the access server of FIG. 3. One bottleneck is the FE bus used to connect the dial shelf's feature boards to the router shelf's forwarding engine—this bus is limited to FE capacity (100 Mbps). A second bottleneck is the forwarding engine itself—this single engine must perform forwarding lookup and header manipulation for every packet processed by the access server, as well as manage the gateway. Thus if the number of active ingress ports doubles, the demand placed on the forwarding engine also roughly doubles. Roughly half—or more, depending on the traffic type mix—of these packets will be received at egress port 136.

Figure 4:
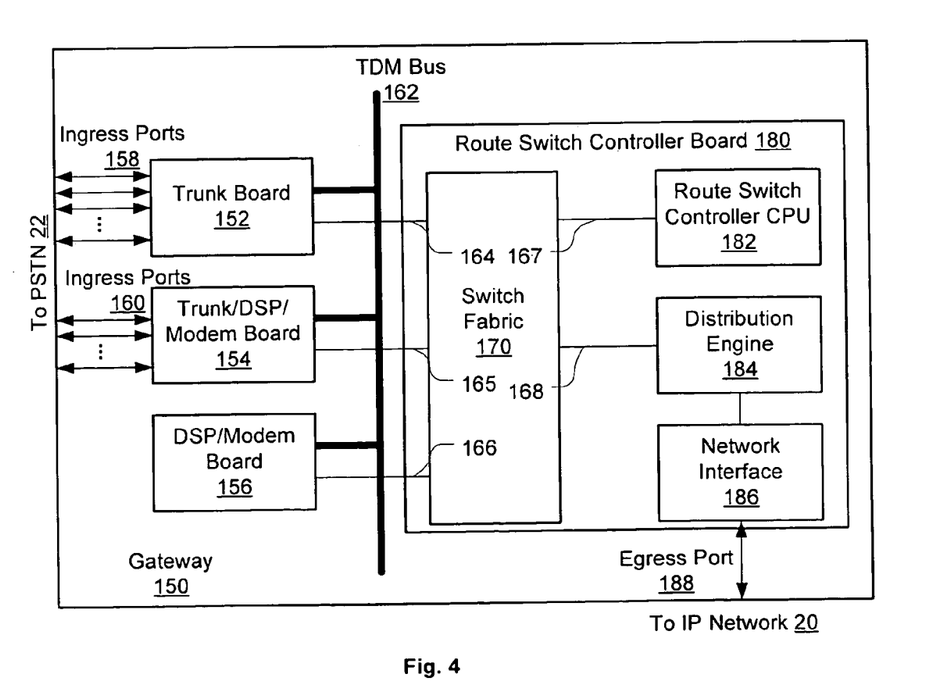
FIG. 4 contains a block diagram for a second gateway configuration that can utilize the present invention.

FIG. 4 contains a high-level block diagram for an alternative gateway implementation 150. Gateway 150 utilizes a single modular chassis that accepts four types of circuit boards: a trunk board 152 and a DSP/modem board 154, which in some embodiments may be respectively identical, hardware-wise (but not software-wise) to trunk board 152 and DSP/modem board 154 of FIG. 3; a trunk/DSP/modem board 156, which is a hybrid board containing both trunk interfaces and DSP/modem resources; and a route switch controller board 180.

Comparing FIG. 3 with FIG. 4, several significant differences are plainly evident. First, the FE hub of FIG. 3 does not exist in FIG. 4; instead, a non-blocking switch fabric, with dedicated FE connections 164, 165, 166, 167, and 168, connects the ingress line cards 152, 154, 156 to the egress port network interface 186 and to a route switch controller (RSC) CPU 182. Second, the single forwarding engine 134 of FIG.

3 is no longer used; instead, forwarding engine functionality is incorporated in line cards 154 and 156, with a backup forwarding engine implemented on RSC CPU 182. For packets arriving at egress port 188, a distribution engine 184 determines which line card the packet belongs to, and distributes that packet to the forwarding engine on the appropriate line card for packet processing.

Figure 5:
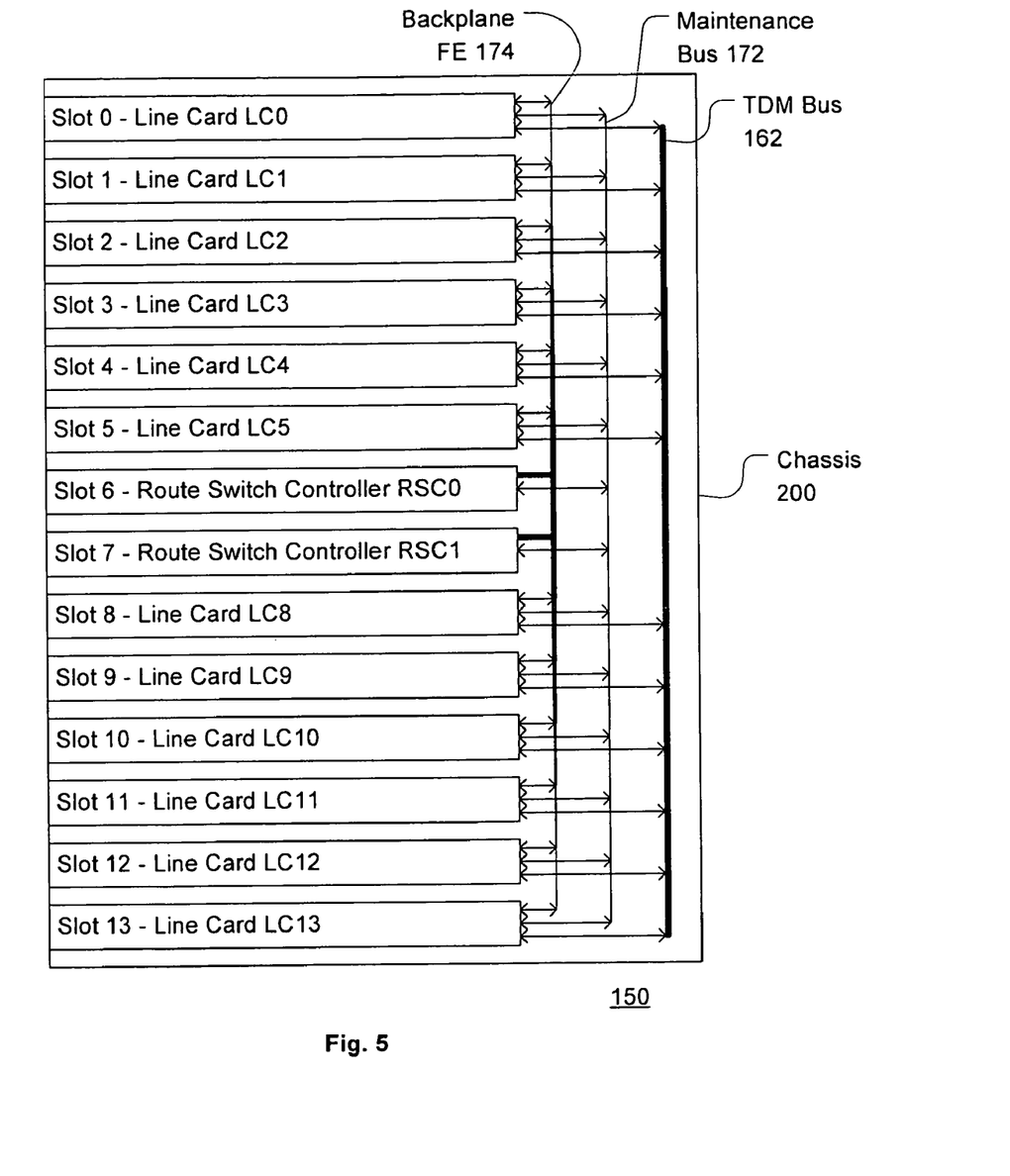
FIG. 5 contains a simplified diagram for bus/card connectivity for the gateway configuration of FIG. 4.

Referring to FIG. 5, a top view for a chassis configuration (not to scale) for one embodiment of gateway 150 is illustrated. Chassis 200 is a rack-mountable chassis with 14 slots (slot 0 through slot 13). The center two slots are reserved for two route switch controller (RSC) cards RSC0 and RSC1. Each line card is assigned to only one RSC at any one time. Each RSC card carries a CPU core, a switch fabric, an egress port option card, an optional daughter card to support packet encryption, a removable flash device, a front panel FE port, and console/auxiliary ports. The other slots may be used for up to twelve line cards, LC0 through LC5 and LC8 through LC13. Each line card can be of one of the three types 152, 154, 156 shown in FIG. 4.

The backplane of chassis 200 comprises three primary buses—a backplane FE interconnect 174, a maintenance bus 172, and a TDM bus 162. Backplane FE interconnect 174 comprises twenty-four point-to-point, full-duplex 100 Mbps FE links. Each link connects one of slots 0-5 and 8-13 to slots 6 and 7. Maintenance bus 172 is a controller area network bus, which uses a two-wire serial multi-master interface that provides a maximum transfer rate of 1 Mbps. TDM bus 162 is actually an aggregation of four separate circuit-switched buses, each supporting 2048 bi-directional 64 kbps channels. Each of the resulting 8192 channels is accessible at each of slots 0-5 and 8-13. Not shown is a reference clock line for the TDM bus—the source of the reference clock can be selected as either a front panel-connected reference on one of RSC0 and RSC1, an internally-generated free-running clock on one or RSC0 and RSC1, or a signal derived from any trunk port on one of the line cards. Also not shown is a bus linking RSC0 and RSC1 to backplane nonvolatile random-access memory (NVRAM), which stores MAC addresses for the chassis, etc.

Backplane FE interconnect 174 and TDM bus 162 provide data paths, respectively, for the bearer packet data and circuit-switched data streams that pass between the various cards in chassis 200. Specific usage of these data paths is detailed at a later point in this specification.

Maintenance bus (MBUS) 172 provides a highly reliable, fault-tolerant bus for overall chassis control. For instance, at system startup, RSC0 and RSC1 use the MBUS to arbitrate, e.g., based on slot number, which line card slots are assigned to each RSC. Each RSC also periodically broadcasts its status over the MBUS—if one RSC does not receive a status message for a predetermined time, the other RSC restarts mastership arbitration. The RSC also uses the MBUS to discover the line cards installed in chassis 200, to power on/off selected line cards, and to reset the line cards. When a line card is powered on or rebooted, the RSC uses the MBUS to download a boothelper image to that line card. While a line card is running, the MBUS allows the RSC to monitor temperature and voltage on the line card, and to provide a virtual console connection (e.g., through a software patch to the RSC's physical console connection) to the line card. If a line card takes a fatal exception, the line card can dump exception information to the RSC via the MBUS.

Figure 6:
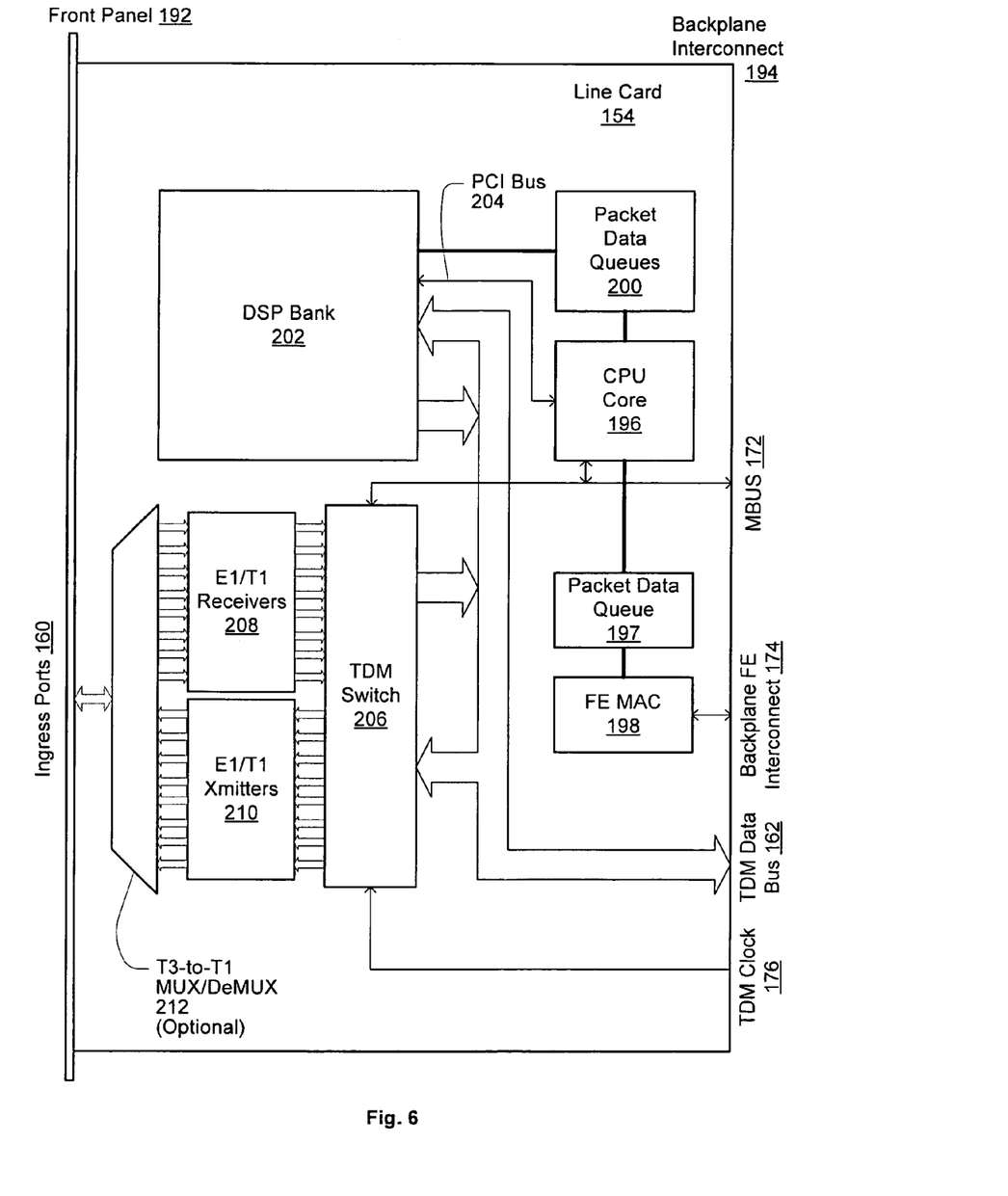
FIG. 6 contains a block diagram for a line card useful in the present invention.

Referring now to FIG. 6, line card 154 will be described. Within line card 154, CPU core 196 contains a host processor, memory for storing software, packet forwarding tables, etc., and other controller hardware for interfacing the CPU core to the various buses shown in FIG. 6. CPU core 196 connects to packet data queues 197 and 200 (both may be part of the same physical memory). A control bus connects CPU core 196 to MBUS 172 and TDM switch 206.

FE MAC 198 provides packet data connectivity between the line card and the router's switching fabric. FE MAC 198 presents an MII port to backplane FE interconnect 174. FE MAC 198 and CPU core 196 transfer packets between themselves using packet data queue 197.

DSP bank 202 comprises one or more digital signal processors for performing computation-intensive packet processing, such as modem emulation and voice data compression/packetization. For a given data stream, DSP bank 202 is responsible for TDM/packet conversion. Each DSP will typically support packet processing for one or more ingress sessions, as instructed via PCI bus 204.

Ingress line circuitry comprises TDM switch 206 and E1/T1 receivers 208 and transmitters 210. In one implementation, receivers 208 and transmitters 210 connect to eight E1/T1 ports on front panel 192. Optionally, a mux/demux 212 (shown) can connect receivers 208 and transmitters 210 to a T3 physical port on front panel 192. When mux/demux 212 is used, it allows up to 28 T1 connections to be multiplexed into the single T3 port. Receivers 208 and transmitters 210 provide framing and a physical interface for selectively connecting multiple ingress ports 80 to, e.g., a PSTN central office, a private branch exchange (PBX), or, in the case of an embodiment of the present invention, an access network. TDM switch 206 multiplexes/demultiplexes data corresponding to the individual E1/T1 timeslots onto assigned time slots on high-speed TDM data bus 162.

A detailed description for a trunk line card 152, for a DSP/modem line card 156, and for the similar cards 112, 114, and 116 of FIG. 3, has been omitted. Trunk line cards 152 and 112 contain essentially the same receiver/transmitter/TDM switch circuitry as line card 154, but omit DSP circuitry. DSP/modem line cards 114, 116, and 156 contain essentially everything else shown in FIG. 6 (but possibly with a larger DSP bank). All line cards contain a host processor to communicate with an RSC card or router shelf.

For use in an embodiment of the present invention as a connection to an access network, a line card can be designed for whatever communications bearer data format an access network requires. It can be appreciated, however, that an existing line card such as card 154 can be used without hardware modification when the access network uses a common TDM trunking communications bearer data format such as E1, T1, or T3.

If the gateway is to function with the access network, the gateway must also exchange signaling with the access network via an appropriate access network protocol, such as V5 or GR.303. This signaling transfer may, e.g., occur on one channel of a TDM access network connection. In such case, TDM switch 206 connects that channel with a DSP (either in bank 202 or in a bank on another card) that is provisioned via software to perform at least the lowest layer of access network signaling.

The remainder of access network signaling functionality can either reside on a DSP, on a corresponding CPU core 196, or on the RSC for an embodiment such as that of FIG. 4 (or be distributed among those components). When the signaling functionality is off-DSP, the DSP can encapsulate access network signals in packets and send to the appropriate processor, and vice-versa.

In the preferred operational mode, access network signaling is handled in the gateway, but a call agent controls the gateway using MGCP or another gateway control protocol. The gateway (more specifically the RSC of FIG. 4) thus communicates via MGCP signaling packets with a call agent. Thus at some processor in the gateway, MGCP instructions that pertain to a connected access network are interpreted and appropriate access network signaling is initiated. Likewise, at some processor in the gateway, access network signaling is interpreted and appropriate MGCP signaling is generated. Whether this interpretation and translation function takes place on a DSP, a line card CPU core, or the route switch controller CPU is a design detail that will likely depend on processor loading and the ease with which for a particular architecture these tasks are easily partitioned to line cards. In many embodiments, it will be most straightforward for the access network signaling high-level functionality and state, MGCP functionality, and translation functionality to reside together on the RSC.

Without need to reference where in the gateway signal interpretation and translation is occurring, the following examples illustrate how basic access network functionality can be implemented with a gateway and call agent. Since these examples use MGCP, a short explanation of the format and limitations of MGCP is appropriate.

MGCP is a master/slave protocol in which gateways are expected to execute commands sent by their call agents. In MGCP, an endpoint is viewed as a gateway port to the outside world, e.g., an ingress port. Each endpoint in a gateway is assigned a specific endpoint identifier, and if the endpoint contains, e.g., multiple circuits, each circuit on that endpoint is also identifiable in MGCP. And a connection is an association between two or more endpoints for the purpose of transmitting data between those endpoints.

A basic example of MGCP call processing is the establishment of a call between two gateways (in this case controlled by the same call agent). When a call is to be established between two endpoints residing on two different gateways, the call agent issues a create connection (CRCX) to a first gateway that provides a port to the first endpoint. The gateway responds by allocating resources and transmitting a session description back to the call agent. The session description contains the information necessary for a third party to send packets to the newly created connection, e.g., an IP address, UDP port, and packetization parameters. Next, the call agent sends a create connection command to the second endpoint, and includes the session description from the first gateway. The second gateway allocates resources to that second connection, and sends its own session description back to the call agent. Finally, the call agent issues a modify connection (MDFY) command to supply the second session description to the first gateway. At any point during the session, the call agent can issue modify connection commands to change connection parameters. The call agent can remove connections by sending a delete connection (DLCX) command to the appropriate gateway.

Normally, gateways only speak when spoken to, that is, they send MGCP packets to the call agent as requested. For instance, the call agent can issue a notification request (RQNT) to a gateway, asking the gateway to report the occurrence of certain events on specified endpoints. When such a request is active and a requested event occurs, the gateway issues a notify (NTFY) command to the call agent to inform the call agent of the event occurrence.

With that background, the following examples illustrate the life of a call between two access network connections on two gateways controlled by a common call agent, e.g., gateways 70 and 72 connected to access networks 80 and 82, respectively, in FIG. 2. Access networks 80 and 82 communicate with gateways 70 and 72 using V5 protocol in this example.

Figure 7:
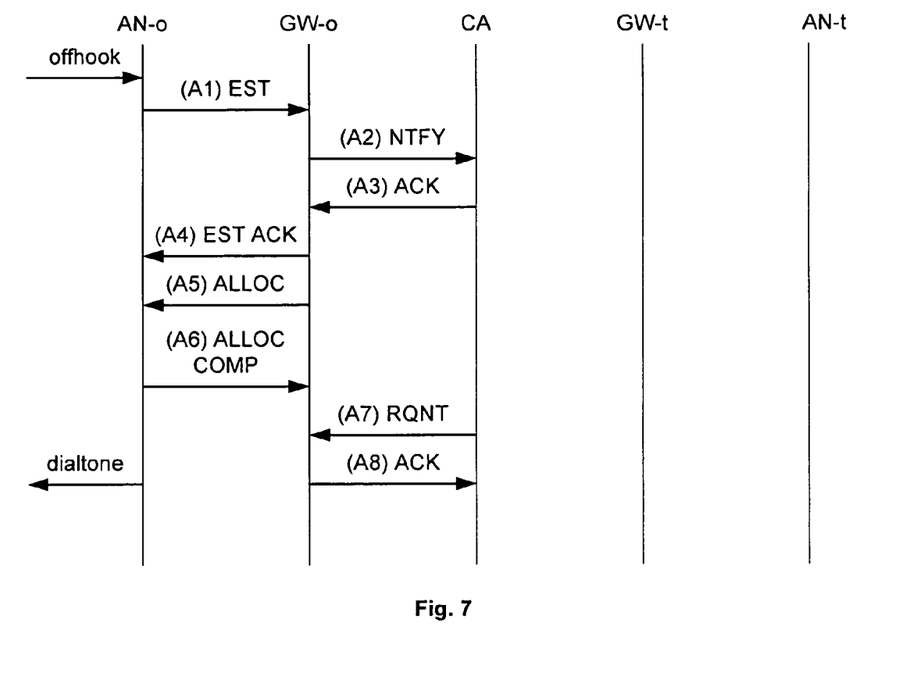
FIG. 7 illustrates call initiation signaling between an access network and a gateway, and between the gateway and its call agent, according to an embodiment of the invention.

When a particular access network connection is not actively carrying a call, the gateway is instructed by the call agent to notify it when an off-hook event occurs. FIG. 7 illustrates how an originating gateway GW-o responds to an off-hook condition for a subscriber connected to access network AN-o. The subscriber picks up a handset, hits an "on" or "send" button, etc., resulting in an off-hook condition detected at AN-o. Signal A1 is an establish request (EST) generated by AN-o, asking for a line allocation to the subscriber. Gateway GW-o receives the EST, but cannot give a line allocation without first receiving permission from the call agent to handle the call. Therefore, the EST is translated to a MGCP NTFY command A2, containing an off-hook event notification, and transmitted to GW-o's call agent CA. Call agent CA returns an acknowledgment (ACK) A3 to GW-o, indicating that it understands the existence of an off-hook condition for the specified subscriber.

Once the call agent has been notified, gateway GW-o sends the V5 commands expected by AN-o, i.e., EST ACK (A4) and ALLOC (A5). AN-o returns an allocation complete command ALLOC COMP (A6) to GW-o upon completion of the allocation. Note that since CA is preferably unaware of the relationship between AN-o and GW-o, these commands are accomplished without the intervention of the call agent and the appropriate V5 access network state is maintained by the gateway. At this point, the access network has a connection for the subscriber, and can transmit dialtone to the subscriber.

Separately, and as a result of the off-hook notification by GW-o, CA issues RQNT (A7) to GW-o, requesting that GW-o collect dialed digits for the endpoint (as well as other events such as on-hook). GW-o acknowledges the new request with an ACK (A8).

Figure 8:
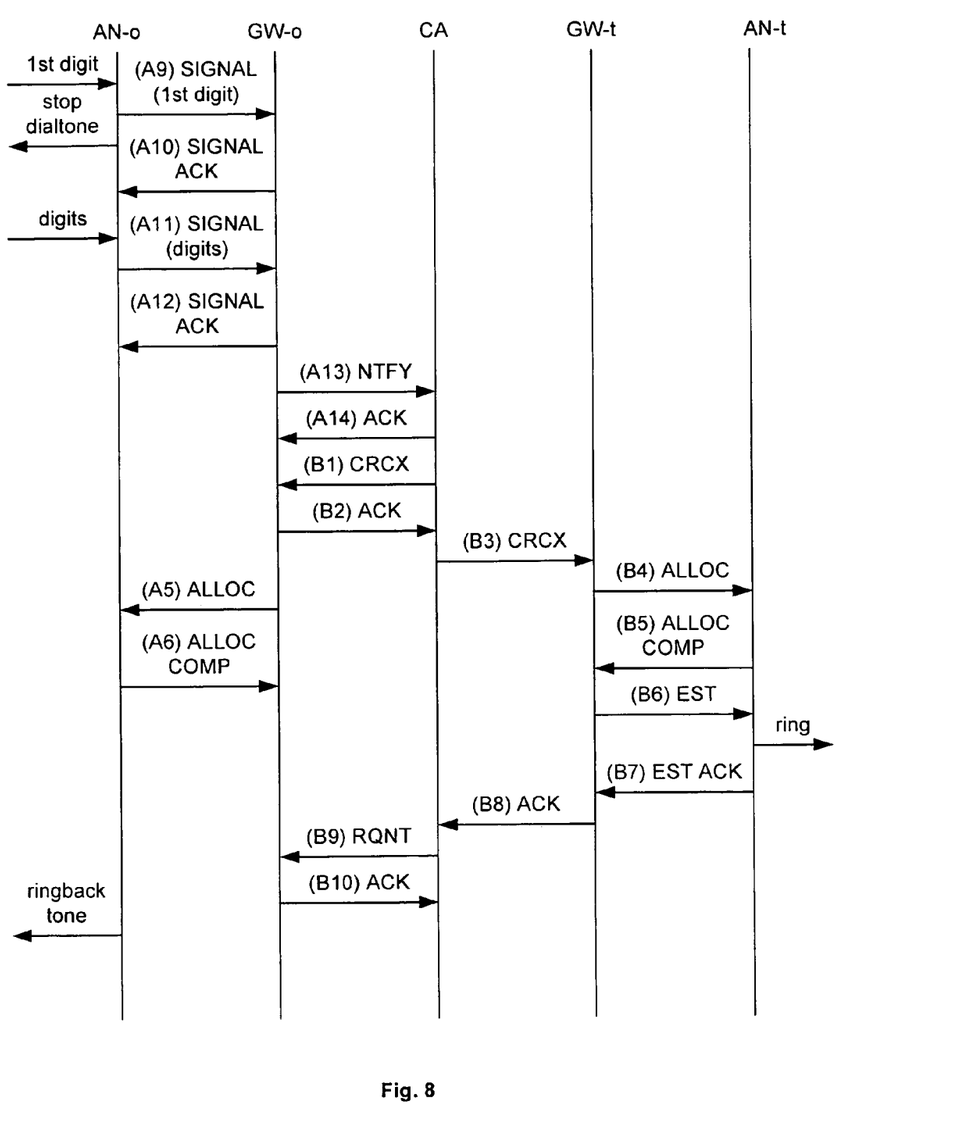
FIG. 8 illustrates connection creation signaling between gateways according to an embodiment of the invention.

FIG. 8 illustrated the establishment of connections to support the call requested by the subscriber. Once the subscriber receives a dialtone from AN-o, the subscriber will begin to transmit digits. Upon receipt of the first digit, AN-o transmits the digit in a SIGNAL transaction (A9) to GW-o. Since GW-o gathers digits in this embodiment, it does not yet send a NTFY packet to CA. GW-o does, however, acknowledge the signal (A10) to AN-o. AN-o continues to signal digits (A11) to GW-o, GW-o gathers them and acknowledges them (A12) back to AN-o. Once the digits for the dialed number are gathered, GW-o sends an MGCP NTFY packet (A13) containing the dialed number to call agent CA. Call agent CA acknowledges receipt of the dialed number (A14) and begins to create connections to service the call.

Call agent CA first creates a connection to the originating endpoint by issuing a CRCX command (B1) to GW-o. Gateway GW-o performs the appropriate internal allocation of resources for the access network circuit, and returns a session description to CA in an ACK packet (B2). CA determines how to reach the dialed number (in this example, the number can be reached through terminating gateway GW-t, also controlled by call agent CA). CA sends a CRCX command (B3), with the session description from GW-o and the dialed digits, to GW-t. GW-t examines the dialed digits and determines that the digits correspond to a subscriber located on access network AN-t. GW-t sends a V5 ALLOC command (B4) to AN-t to designate a circuit for the dialed subscriber; AN-t acknowledges the allocation with ALLOC COMP command (B5). GW-t then sends an establish command (B6) to AN-t; AN-t both acknowledges (B7) the establish command back to GW-t and sends ringing voltage (or an appropriate signal if the destination subscriber does not have an analog line) to the called subscriber.

Once the access network connection has been allocated and established (and internal allocations within the gateway have been set up as well), GW-t acknowledges (B8) the create connection command received from CA, returning its session description. CA sends a RQNT command (B9) to originating gateway GW-o, removing the previous request for digits. GW-o acknowledges the request (B10) back to CA. Although not illustrated, either the originating or terminating gateway can begin the ringback signal to the calling party.

Figure 9:
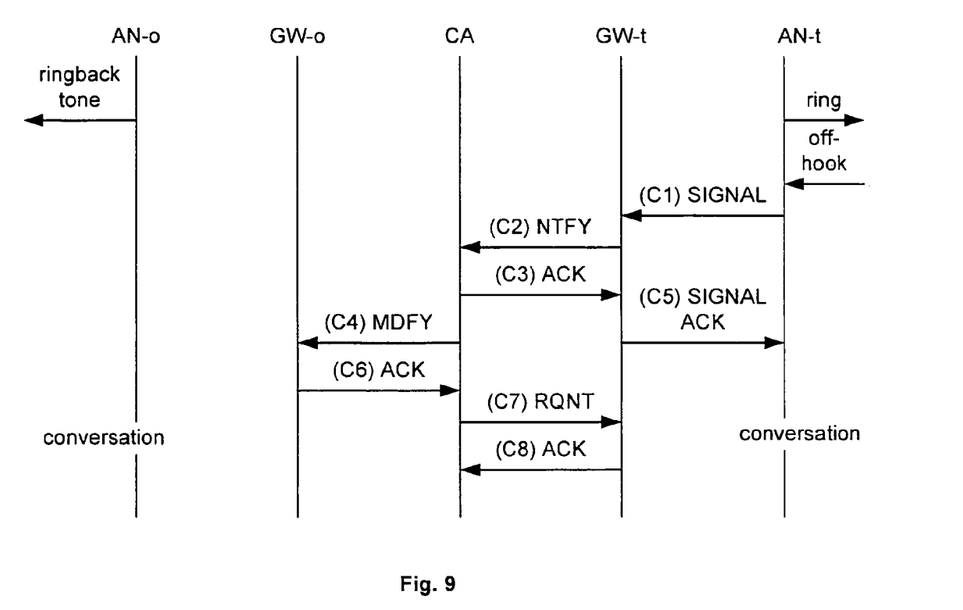
FIG. 9 illustrates call completion signaling upon answer by the called party according to an embodiment of the invention.

FIG. 9 illustrates connection of the call when the called party answers. When the called party goes off-hook, AN-t signals the off-hook condition (C1) to GW-t. Normally, GW-t has been instructed to notify CA whenever an off-hook condition exists at the endpoint, thus a NTFY (C2) MGCP packet is dispatched to CA to alert CA that the called party is now off-hook. CA acknowledges the off-hook notification (C3) back to GW-t. GW-t then acknowledges (C5) off-hook signal C1 back to AN-t. GW-t also begins packetizing audio data from the appropriate endpoint/channel to AN-t and directing those packets to GW-o (not shown).

Meanwhile, CA is completing the originating end of the call. CA sends a MDFY packet (C4) to GW-o, containing the session description received from GW-t. GW-o acknowledges (C6) the MDFY back to CA. GW-t also begins packetizing audio data from the appropriate endpoint/channel to AN-o and directing those packets to GW-t (not shown).

Somewhere during this time period, CA also sends a new notification request (C7) to GW-t, asking that CA be notified if an on-hook condition at the called endpoint/channel is detected. GW-t is expected to ACK (C8) this RQNT.

Figure 10:
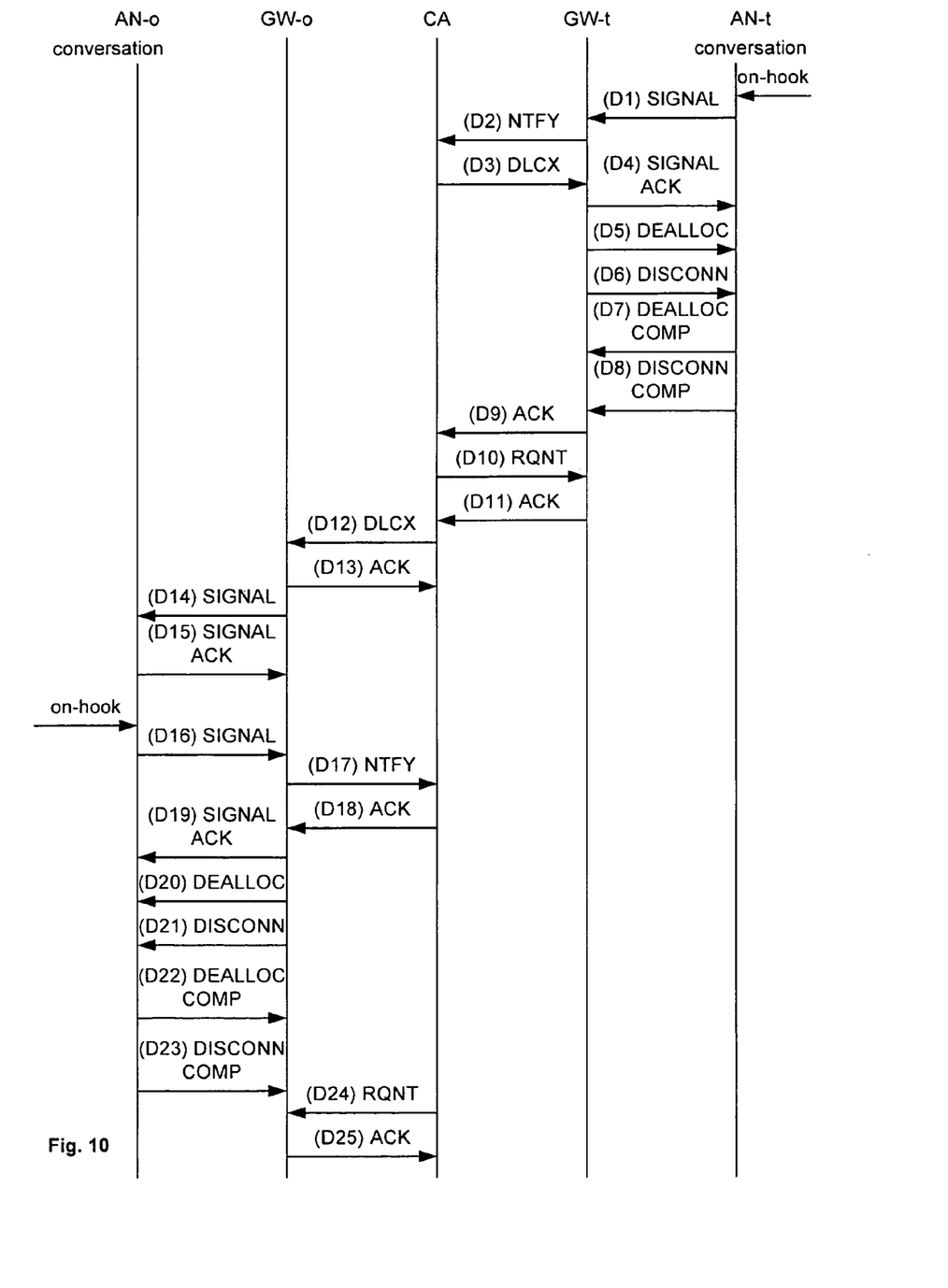
FIG. 10 illustrates call termination signaling according to an embodiment of the invention.

FIG. 10 illustrates how connections are torn down when the call ends. Although the called party in this case goes on-hook first, the process is similar for the calling party going on-hook first. When the called party goes on-hook, AN-t signals (D1) the on-hook condition to GW-t. GW-t sends a NTFY packet (D2) to CA, as it has been instructed, notifying CA of the on-hook condition. CA returns a DLCX packet (D3) to GW-t, instructing GW-t to delete the connection. GW-t then acknowledges (D4) the on-hook signal to AN-t, and sends deallocate (D5) and disconnect (D6) signals to AN-t. AN-t signals back to GW-t when the deallocate and disconnect actions have been completed (D7 and D8). Once GW-t has received these acknowledgments from AN-t (and possibly cleaned up its own internal allocations), GW-t acknowledges back to CA that it has deleted the connection. CA responds with a new RQNT (D10) to GW-t, placing the endpoint/channel in a quiescent mode that will notify CA if an off-hook condition is again detected.

CA then proceeds to tear down the connection on the opposite (calling) end by issuing a DLCX packet (D12) to GW-o. The calling gateway acknowledges (D13) the delete connection command and stops sending packets to the called endpoint on GW-t (in a conference call, for example, this would not stop GW-o from sending packets to other active conferencers). GW-o can also notify AN-o that the other party is on-hook via SIGNAL (D14), and AN-o acknowledges this signal (D15) back to GW-o.

Once the calling party goes on-hook, AN-o signals the on-hook condition (D16) to GW-o, which notifies CA (D17) in turn of the on-hook condition. When CA acknowledges (D18) the on-hook condition, GW-o and AN-o go through a sequence of steps (D19-23) similar to D4-8 in order to deallocate and disconnect the call on the access network. CA sends a RQNT (D24) to GW-o to place it back in its quiescent condition. GW-o acknowledges (D25) the notify request and the call ends.

It will be apparent to those of ordinary skill in the art, after reading the above description, that other common call processing operations can also be handled in similar fashion, by provisioning the gateways to perform appropriate translation between MGCP commands and access network protocol sequences. And although no device errors occurred in the examples above, error handling procedures for specific errors will also be apparent to those of ordinary skill after reading the above description.

In a preferred embodiment, the call agent can remain unaware of the presence of the access network. From the call agent's viewpoint, the voice data port on the gateway has a number of endpoint/circuits equal to the unique customer lines reachable through the access network. From the gateway's viewpoint, it may have a much smaller number of channels to the access network, and thus performs internal mapping between the call agent's view of customer lines and the physical channels actually in use to the access network. One issue is thus, when all channels to the access network are in use, the call agent may believe that other customers can still be reached through the gateway and may attempt to connect other calls even when an access network connection is fully loaded. The gateway can respond by rejecting connections, e.g., for lack of resources.

In some embodiments, a voice data port can be connected either to an access network or to a circuit-switched trunk. A configuration manager residing on the gateway can associate either an access network interface (described above) or a trunk interface with the voice data port, depending on what that port is connected to. The configuration manager thus allows the gateway to report its current configuration to a call agent, and to have some ports configured as access network ports and other ports configured as trunk ports. The gateway can accept, e.g., MGCP commands from the call agent and interpret them with the appropriate interface, depending on how the specified endpoint is configured.

It is noted that where a gateway serves as both an originating gateway and a terminating gateway for a call, that call may be "hairpinned" on the TDM bus of the gateway. Preferably, however, the call agent is still involved in granting permission to use the gateway resources, even if the call is between two customers on the same access network.

It can be appreciated that the embodiments presented above are exemplary applications of the invention to specific gateway architectures and protocols, and to a simplified network. Obviously, the present invention is applicable to other access network protocols, other gateway control protocols, multiple coordinating call agents, and virtually any gateway architecture. For instance, a particular gateway need not use modular cards, and need not distribute processing among processors as shown in the embodiments above. Although in some embodiments access network signaling and data are received on the same port, this is not necessary. Likewise, a gateway may also have multiple packet data ports and incorporate network routing functionality. Trunk signaling, e.g., SS7, may be received at a trunking voice data port and backhauled to a call agent for processing, while access network signaling is processed locally at the gateway.

What is claimed is:

1. A gateway, comprising:
   a packet data port configured to connect to and communicate with a packet-switched network;
   an access network interface configured to connect to and communicate with an access network, wherein said access network aggregates received data and signaling from a plurality of subscriber devices on a trunk extending directly to the access network interface; and
   a processor configured to:

exchange signaling, using an access network protocol, with an access network device connected to the access network interface;

exchange signaling packets, using a packet-based gateway control protocol and the packet data port, with a call agent reachable over the packet-switched network; and translate signaling between the access network protocol and the packet-based gateway control protocol, such that the gateway emulates a group of physical subscriber connections to the access network device, and such that the gateway controls the access network device based on commands in signaling packets issued by the call agent.

2. The gateway of claim 1, wherein the processor is further configured to:

translate an access network protocol establishment request received over the access network interface into a packet-based gateway control protocol communication and send the packet-based gateway control protocol communication over the packet data port to the call agent;

receive back a call allocation authorization from the call agent over the packet data port; and send an access network protocol notification over the access network interface indicating authorization for the access network protocol establishment request, said access network protocol notification sent to the access network device.

3. The gateway of claim 2, wherein said received access network protocol establishment request is generated in response to an off-hook condition detected at the access network device.

4. The gateway of claim 2, wherein the packet data port further receives back a command request in response to said translation, the command request commanding the gateway to collect values for digits dialed by a subscriber.

5. The gateway of claim 1, wherein said access network protocol comprises V5 and said gateway control protocol comprises Media Gateway Control Protocol (MGCP).

6. The gateway of claim 2, wherein said access network protocol notification is configured to cause the access network device to send back an allocation complete command and transmit a dialtone to a subscriber.

7. A gateway, comprising:

a packet data port configured to connect to and communicate with a packet-switched network;

an access network interface configured to connect to and communicate with an access network, wherein said access network terminates subscriber lines; and circuitry configured to:

exchange signaling, using an access network protocol, with an access network device of the access network;

exchange signaling packets, using a packet-based gateway control protocol and the packet data port, with a call agent reachable over the packet-switched network; and translate signaling between the access network protocol and the packet-based gateway control protocol, such that the gateway emulates a group of physical subscriber connections to the access network device, and such that the gateway controls the access network device based on commands in signaling packets issued by the call agent.

8. The gateway of claim 7, wherein a trunk physically connects the access network device to the access network interface.

9. The gateway of claim 8, wherein said trunk is physically terminated by the access network interface.

10. The gateway of claim 7, wherein the gateway and the call agent emulate a Publicly Switched Telephone Network (PSTN) switching point to the access network device.

11. A computer-readable medium storing instructions that, if executed, result in:

exchanging signaling, using an access network protocol, with an access network device that terminates subscriber lines;

exchanging signaling packets, using a packet-based gateway control protocol, between gateway for a packet-switched network and a call agent operating in the packet-switched network; and translating signaling between the access network protocol and the packet-based gateway control protocol, such that the gateway emulates a group of physical subscriber connections to the access network device, and such that the gateway controls the access network device based on commands in signaling packets issued by the call agent.

12. The computer-readable medium of claim 11, wherein said access network signaling is transmitted over a trunk that is not part of the Publicly Switched Telephone Network (PSTN).

13. The computer-readable medium of claim 12, wherein said signaling is exchanged over a gateway voice data port.

14. A gateway, comprising:

means for exchanging signaling, using an access network protocol, with an access network device that terminates subscriber lines;

means for exchanging signaling packets, using a packet-based gateway control protocol, between the gateway and a call agent operating in a packet-switched network; and means for translating signaling between the access network protocol and the packet-based gateway control protocol, such that the gateway emulates a group of physical subscriber connections to the access network device, and such that the gateway controls the access network device based on commands in signaling packets issued by the call agent.

15. The gateway of claim 14, wherein the gateway and the call agent emulate a Publicly Switched Telephone Network (PSTN) switching point to the access network device.

* * * * *